United States Patent [19]

Chapman

[11] Patent Number: 5,437,216

[45] Date of Patent: Aug. 1, 1995

[54] UNIVERSAL HYDRAULIC VALVE

[75] Inventor: Leonard T. Chapman, North Hollywood, Calif.

[73] Assignee: Leonard Studio Equipment, Inc., North Hollywood, Calif.

[21] Appl. No.: 237,447

[22] Filed: May 3, 1994

[51] Int. Cl.[6] .................. F15B 11/08; F15B 13/04
[52] U.S. Cl. ........................ 91/446; 91/448; 137/596
[58] Field of Search .......... 91/446, 448, 497, 358 A, 91/388, 392, 403, 410; 137/625.69, 596; 60/413

[56] References Cited

U.S. PATENT DOCUMENTS

| | | | |
|---|---|---|---|
| 4,325,402 | 4/1982 | Akkerman et al. | 137/625.69 X |
| 4,360,187 | 11/1982 | Chapman | 254/8 R |
| 4,716,933 | 1/1988 | Stoever et al. | 137/596 X |
| 4,738,279 | 4/1988 | Kropp | 137/596 |
| 4,854,222 | 8/1989 | Vick | 137/596 X |
| 4,899,097 | 2/1990 | Chapman . | |
| 5,038,671 | 8/1991 | Ueno | 91/446 X |
| 5,220,861 | 6/1993 | Kamimura | 91/410 X |

FOREIGN PATENT DOCUMENTS 0047573 3/1984 Japan ................ 137/625.69

OTHER PUBLICATIONS

Brochure F (Sidewinder by Chapman, 1991).
Photographs H–J (Photographs of Olympian Camera Crane) 1981.
Brochure K (The Olympian Camera Crane, 1991).

*Primary Examiner*—Edward K. Look
*Assistant Examiner*—Hoang Nguyen
*Attorney, Agent, or Firm*—Lyon & Lyon

[57] ABSTRACT

A universal hydraulic stop valve has housing having check valves in a check valve bore. A needle in needle bore has spaced apart seals which may alternately seal against valve seats on adjustable knobs, with movement of the needle, which may be mechanically linked to a machine element moved by a hydraulic actuator. The universal hydraulic valve sets accurate starting and stopping positions, and also provides for gradual feathered stops.

16 Claims, 9 Drawing Sheets

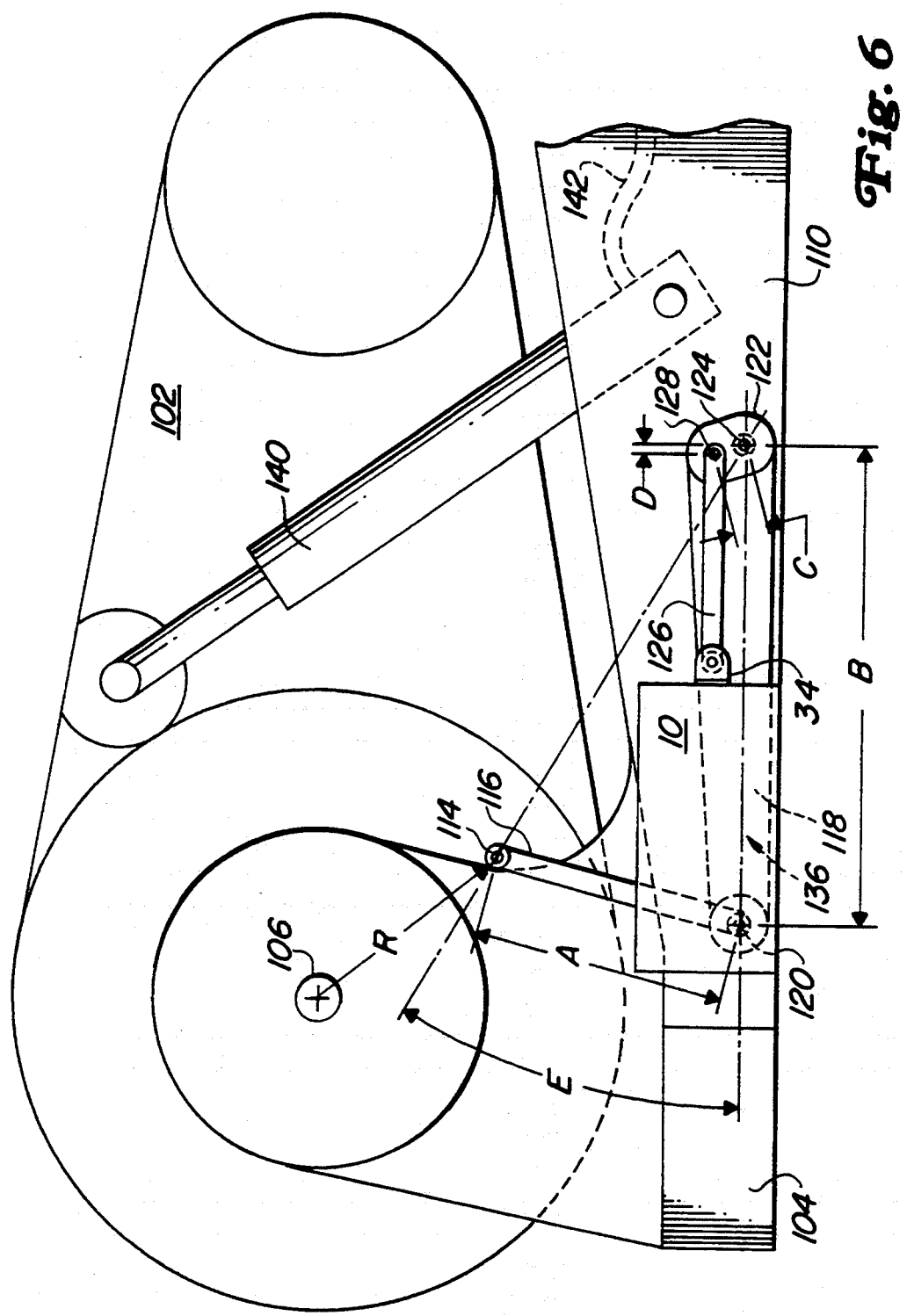

UNIVERSAL HYDRAULIC VALVE

BACKGROUND OF THE INVENTION

Hydraulic cylinders or actuators are used in various machines to move or position components or equipment, generally where large forces are needed. Hydraulic valves control the flow of hydraulic fluid into and out of the hydraulic cylinder to control or stop its movement. In certain applications, e.g., raising or lowering a platform the hydraulic actuator movement must start and stop gradually. In other commercial and industrial applications, the hydraulic actuator must stop at a precise location, but with a smooth and gradual stop.

Various hydraulic valves and valve actuators or control devices have been used to start, stop and position hydraulic actuators, either manually or automatically. However, these valves and devices generally have certain disadvantages in their performance characteristics, flexibility and ease of use, reliability and other characteristics.

Accordingly, it is an object of the invention to provide a universal hydraulic valve having improved operation and performance. Other and further objects and advantages will appear hereinafter.

SUMMARY OF THE INVENTION

To these ends, a universal hydraulic valve has a needle with spaced apart soft seals alternately engageable into opposing valve seats within a housing. Preferably, the valve seats are provided on a stem of an adjustment knob threaded into the housing. Check valves within the housing allow hydraulic fluid flow only in a single direction. The needle is advantageously mechanically linked to a hydraulic actuator, or a machine element or member moved by the actuator, and the valve seats positioned using the knob handles to set stopping positions. Preferably, the soft seal and valve seat form a gradual angle of engagement, so that fluid flow is gradually cut off as the valve closes, and the hydraulic actuator gradually brought to a stop.

BRIEF DESCRIPTION OF THE DRAWINGS

Other objects and features of the present invention will become apparent from the following detailed description taken in connection with the accompanying drawings. It is to be understood, however, that the drawings are for purpose of illustration only and are not intended as a definition of the limits of the invention.

In the drawings, wherein similar reference characters denote similar elements throughout the several views:

FIG. 6 is a side elevation schematic view fragment of the camera dolly and valve of FIGS. 1 and 5;

DETAILED DESCRIPTION OF THE DRAWINGS

Figure 1:
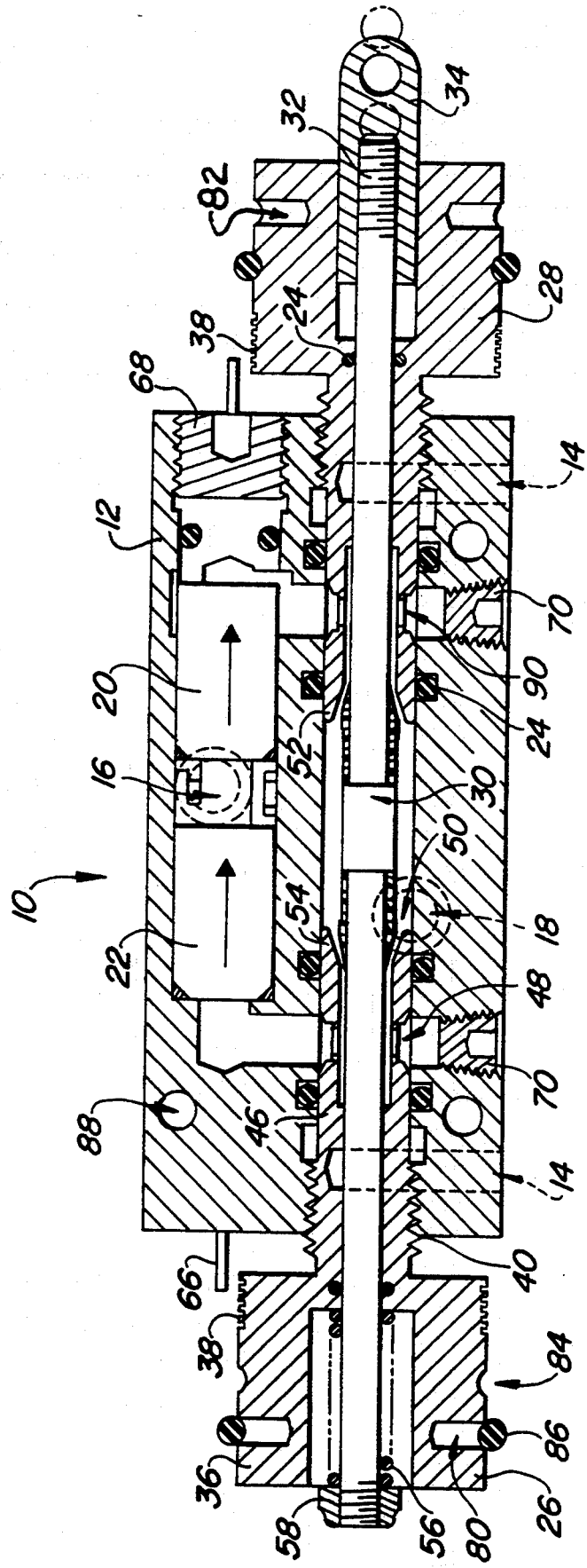
FIG. 1 is a bottom up section view of the present universal hydraulic valve.
Figure 3:
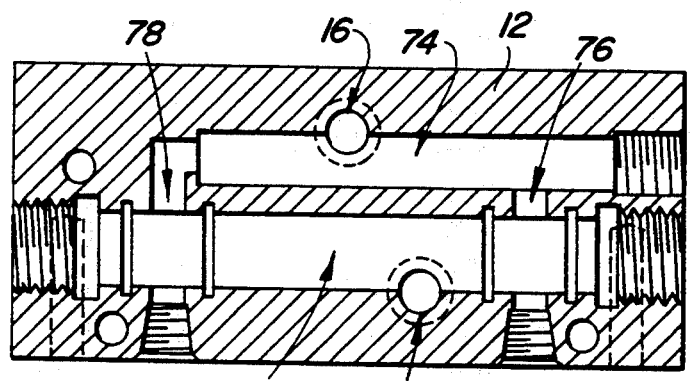
FIG. 3 is a section view of the housing of the valve of FIG.
Figure 4:
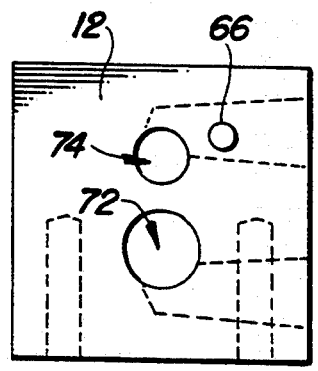
FIG. 4 is a right side elevation view thereof.

Turning now to drawings, as shown in FIG. 1, the present universal hydraulic valve 10 includes a housing 12 having four mounting holes 14. Referring to FIGS. 1, 3 and 4, an inlet port 16 on the top of the housing extends through the housing 12 to a check valve bore 74. An outlet port 18 similarly extends from the top of the housing 12 to a needle bore 72.

As best shown in FIG. 3, the check valve bore 74 and needle bore 72 in the housing 12 are connected via vertical connecting bores 76 and 78. For ease of manufacture, these bores are drilled from the sides of the housing 12 (preferably formed of an aluminum block), and are then permanently plugged as necessary using the threaded pipe plugs 68 and 70, as shown in FIG. 1.

Referring once again to FIG. 1, a first check valve 20 and a second check valve 22 are located within the check valve bore 74 on opposite sides of the inlet port 16. A down stop adjust knob 26 has a shoulder 40 threaded into the housing 12. The down stop adjust knob 26 has a knob handle 36 preferably including a series of colored rings 38 around its circumference. Pin bores 80 extend radially into a pin bore groove 82 in the handle 36. A stem 46 extends from the threaded shoulder 40 of the down stop adjust knob 26. The stem has a groove 48 and a seat or stem bore 50 extending into the stem 46. Stem holes 90 pass through the stem 46 at the groove 48 to allow fluid to flow from the stem bore 50 into the connecting bores 76 and 78. The stem bore 50 and stem holes 90 are large enough so that fluid flow through them is sufficient to avoid significantly slowing movement of the cylinder. The end of the stem 46 is conically tapered to form a down stop valve seat 54. The stem bore 50 and holes 90 form an open flow path, regardless of the longitudinal or rotational position of the adjust knob 26.

An up stop adjust knob 28 is threaded into the housing 12 opposite to the down stop adjust knob 26. The up stop adjust knob 28 is substantially identical to the down stop adjust knob, and similarly includes a knob handle 36, colored rings 38, threaded shoulder 40, stem 46, groove 48, holes 90, stem bore 50 and an up stop seat 52. A needle 30 extends through the housing 12 and through the adjust knobs 26 and 28. An end locking nut 58 is threaded and locked onto the end of the needle 30 adjacent the down stop adjust knob 26. A compression needle spring 56 between the end nut 58 and the down stop adjust knob 26 biases the needle 30 (to the left side as shown in FIG. 1). A piston nut 34 positioned partially within the up stop adjust knob 28 is threaded and locked onto threads on the other end of the needle 30. A reference pin 66 attached to each end of the housing 12 provides a point of reference for positioning or aligning the colored rings 38 on the adjustment knobs.

Figure 2:
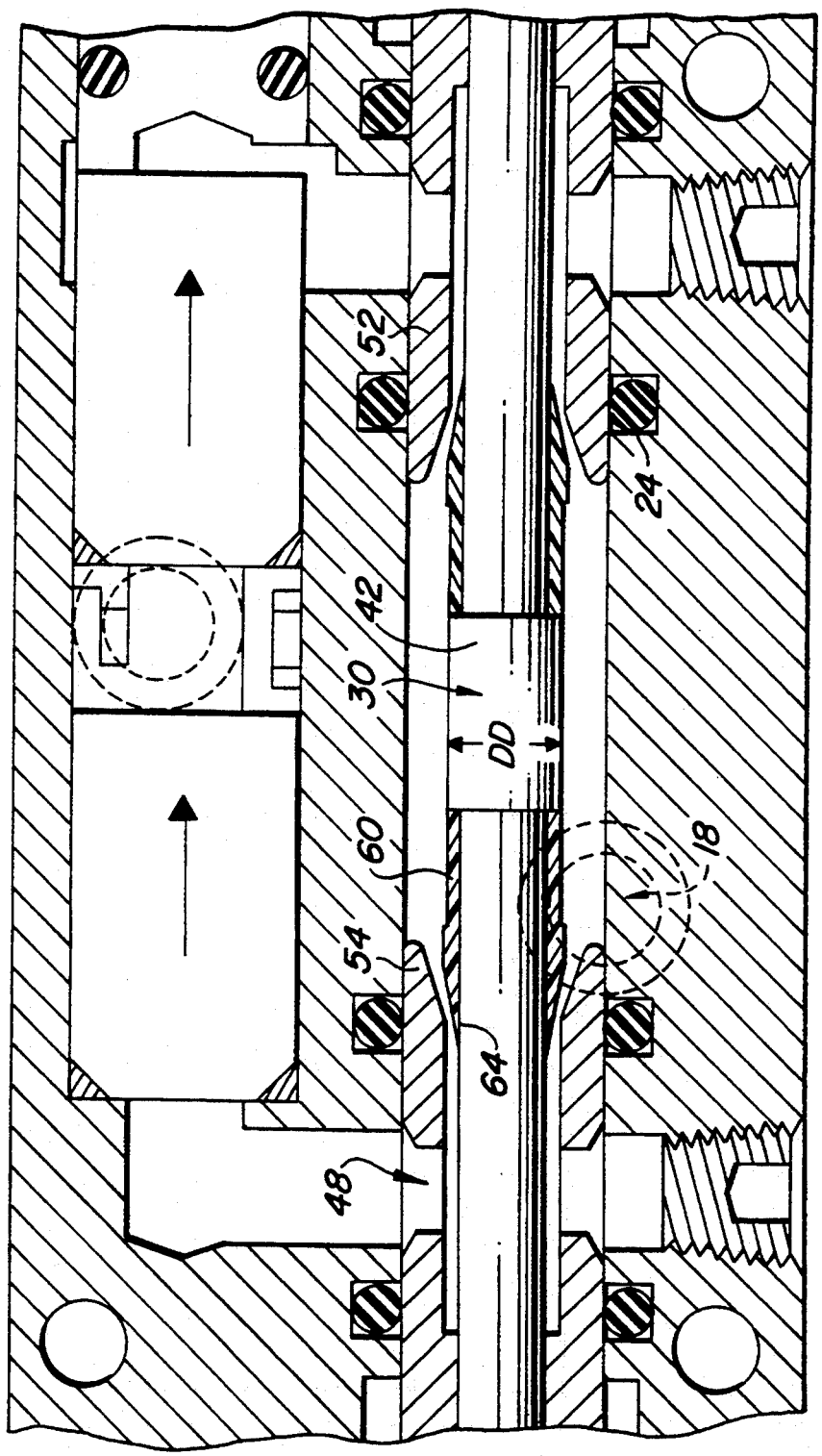
FIG. 2 is an enlarged section view of the central section of the needle of the valve of FIG. 1.
Figure 2A:
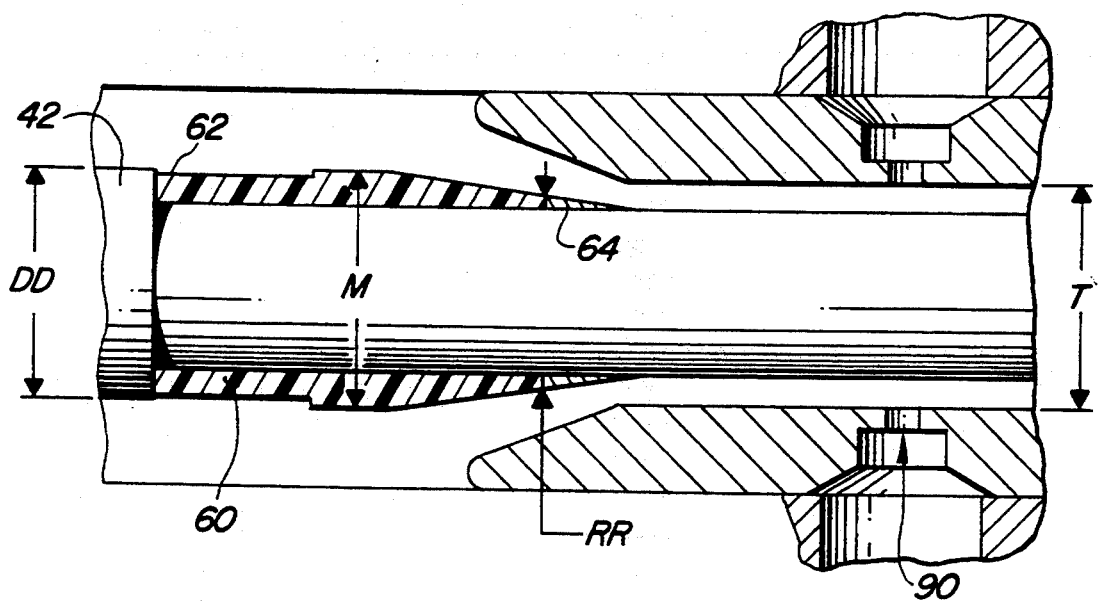
FIG. 2a is a further enlarged view of the up seat shown in FIG. 2.

Referring now to FIG. 2a, the needle 30 has a center section 42 having a larger diameter DD than the ends of the needle 30. A conical pressed on retaining ring 64 has a cone or ramp angle of about 8° from horizontal, although a steeper ramp, e.g., 10° may be used for faster stopping. A "soft" seal 60, preferably Delrin, UHMW plastic or Teflon (or other suitable softseal), is secured against a shoulder 62 by the retaining ring 64. The diameter DD is slightly less than the diameter T of the stem bore 50. The soft seal maximum diameter M is slightly larger than the bore T. O-rings 24 seal the needle 30 and adjust knobs 26 and 28 against the housing 12. The maximum diameter RR of the retaining ring 64 is less than diameter T.

Figure 5:
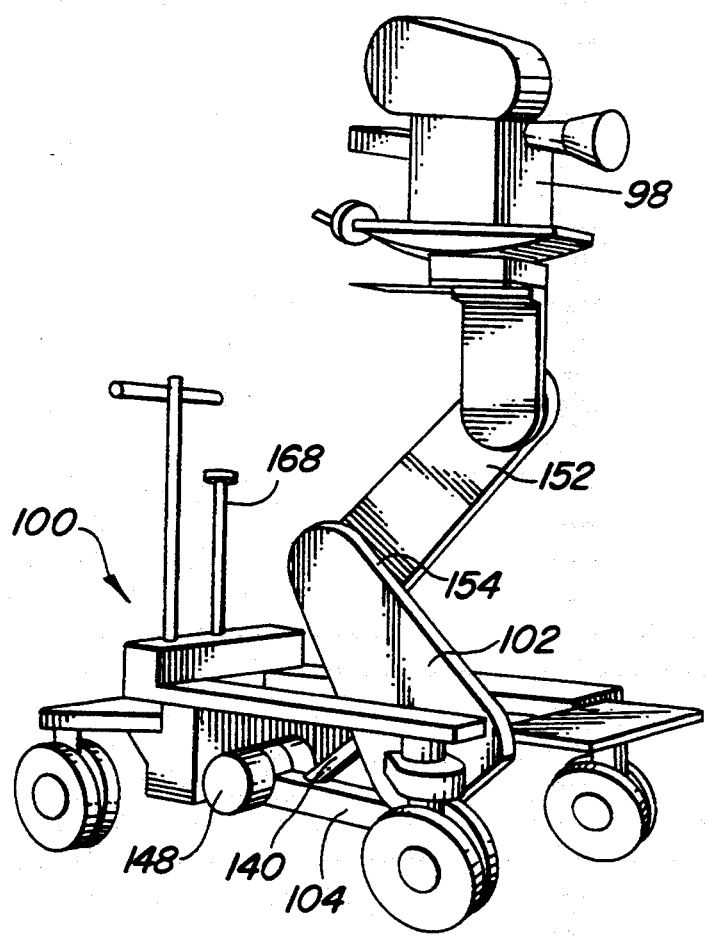
FIG. 5 is a perspective view of a camera dolly on which the universal hydraulic valve of FIG. 1 may be advantageously used.

An example of use of the present valve 10 is shown in FIGS. 5-9. Turning to FIG. 5, in the motion picture industry, a camera 98 is typically mounted on a camera dolly 100, so that the camera may be quickly and easily moved about during filming. The camera dolly 100 has an arm 102 pivotally attached to a dolly chassis 104 at an arm pivot 106. The dolly 100 may have an arm 102 with upper and lower arm members 152 and 154, as shown in the figures, and as described in detail in my U.S. Pat. No. 4,360,187 (incorporated by reference herein) or it may have a single section boom or crane arm. The type of arm on the camera dolly 100 or the movement of the arm is substantially immaterial to use of the present valve 10.

Figure 7:
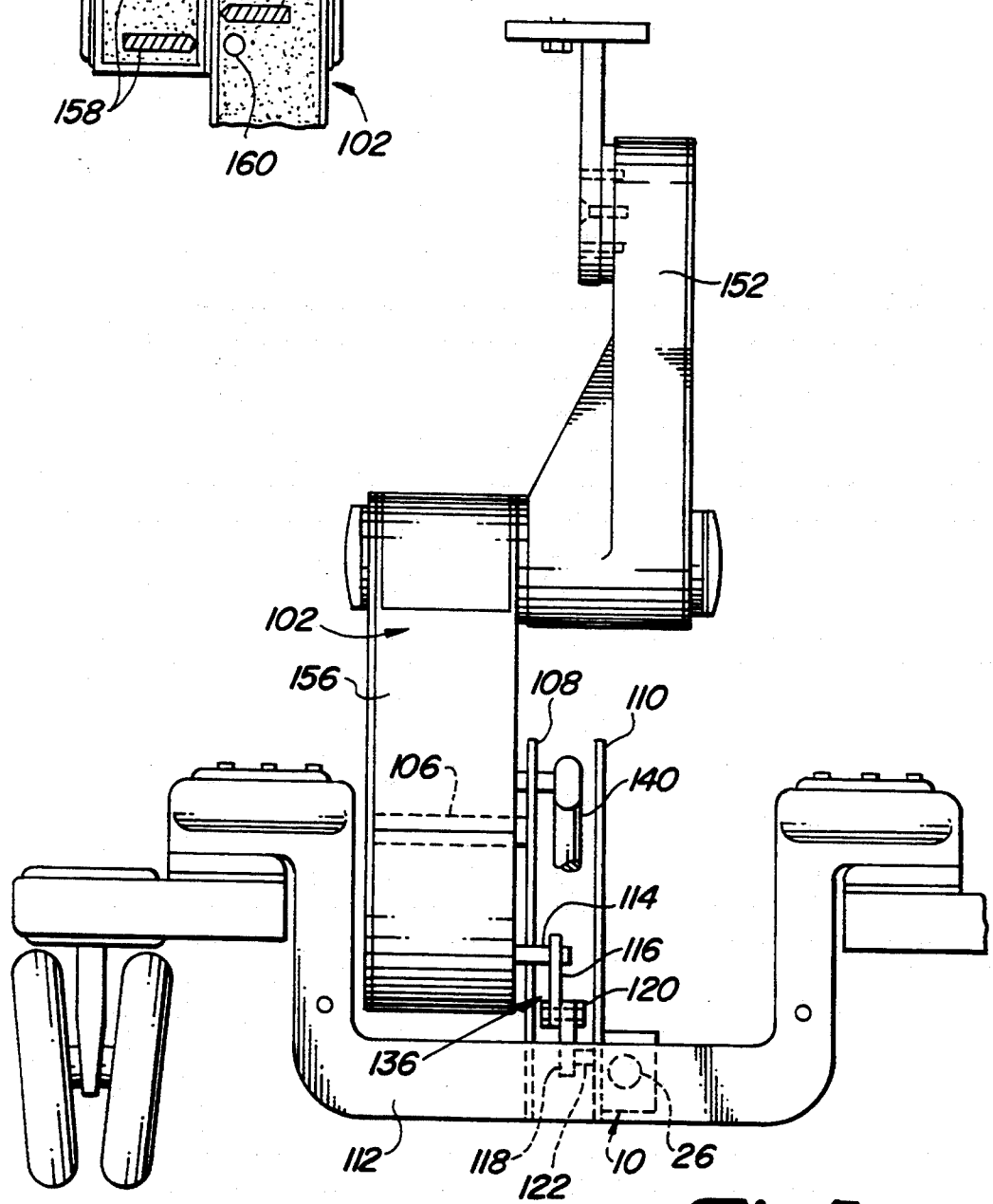
FIG. 7 is a front elevation view fragment of the camera dolly of FIG. 5, including the universal hydraulic valve linked to the arm of the dolly.
Figure 8:
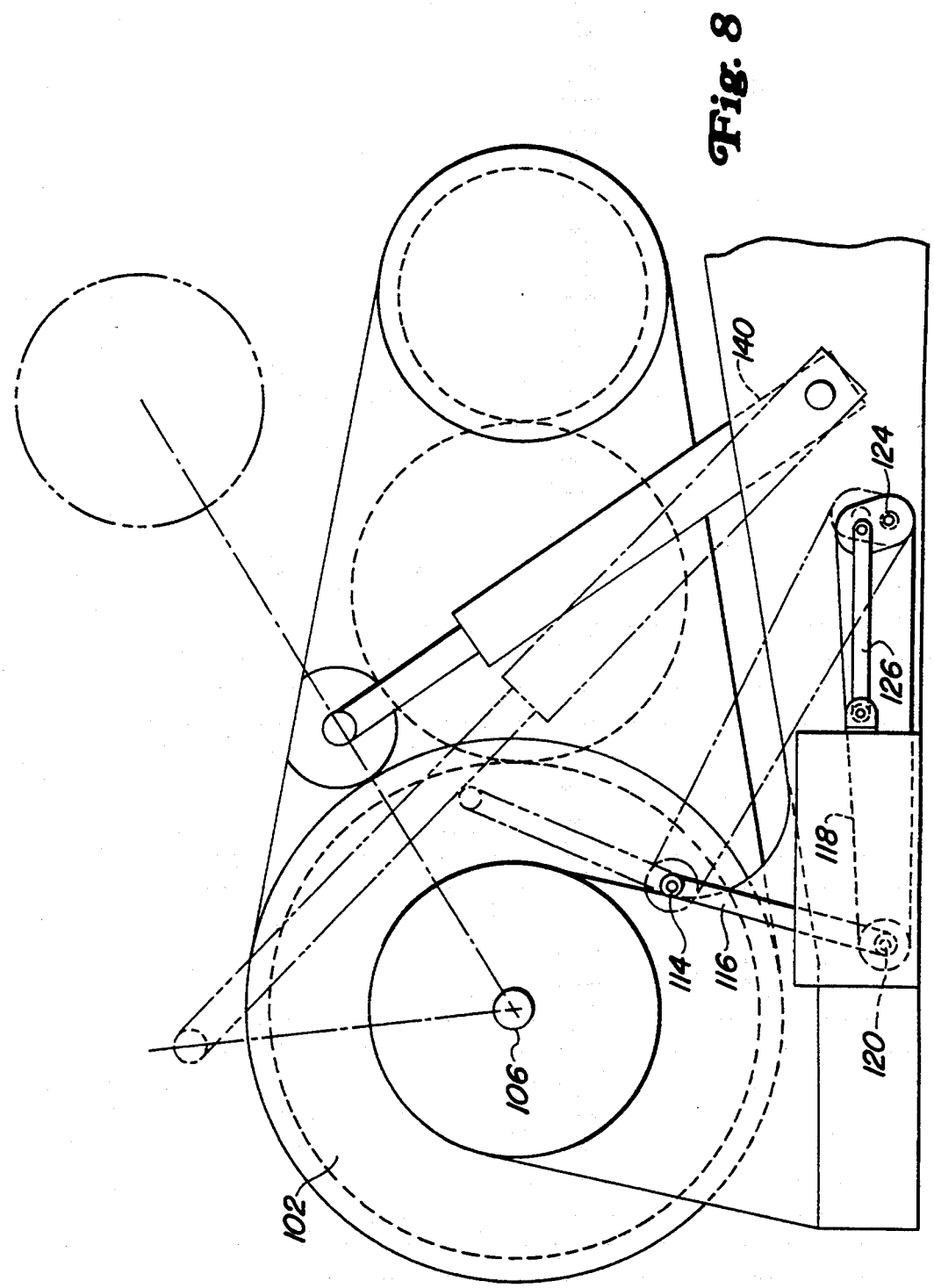
FIG. 8 is a side elevational geometric construction showing alternate positions of the dolly arm and linkage to the hydraulic valve.
Figure 9:
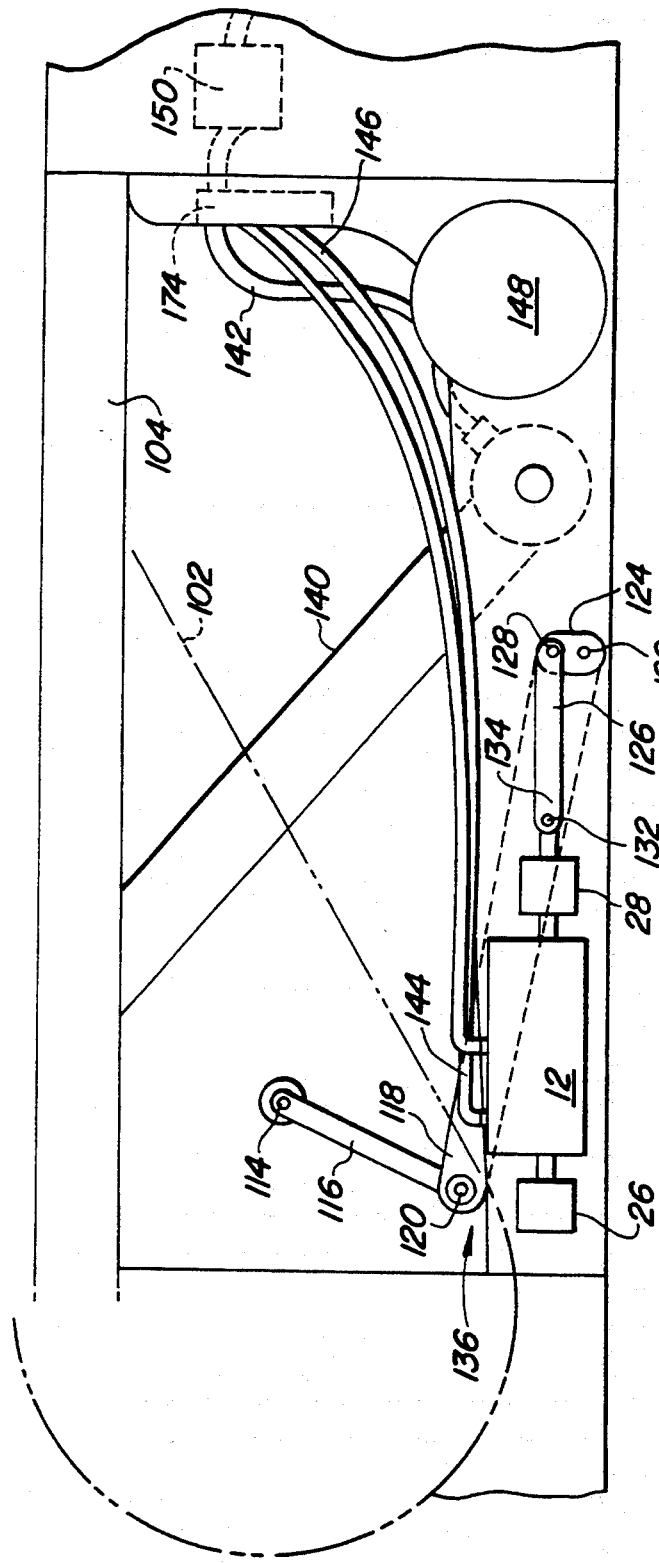
FIG. 9 is an enlarged side elevation view fragment showing the installation of the present universal hydraulic valve onto the camera dolly of FIG. 5.

FIGS. 6-9 show a preferred application of the present valve on a "Super PeeWee" camera dolly 100, which is shown in FIG. 5. As shown in FIGS. 6, 7 and 9, the dolly 100 has a first lower frame plate 108 spaced apart from a second lower frame plate 110, with both plates attached to and forming part of the dolly chassis 104. Towards the front of the dolly 100, the plates are also attached to a forward cross member 112. The valve 10 is attached to the outer surface of the second lower frame plate 110, adjacent to the forward cross member 112 via screws through the mounting holes 14.

The needle 30 of the valve 10 is linked to the arm 102 by a linkage 136, which converts the relatively large pivotal movement of the arm 102 to a very small longitudinal movement of the needle 30. The linkage 136 includes an arm link 106, a lever link 118, a link pivot bolt 120, a short lever 124 and a connecting shaft 126. A stud 114 extends from the arm 102 and is pivotally attached to the arm link 116. The arm link 116 is pivotally attached to the lever link 118 by a link pivot bolt 120. The lever link 118 is locked onto a short lever shaft 122 extending through a hole in the second lower frame plate 110. Shaft 122 also extends through and is supported by the first lower frame plate 108. The short lever 124 is irrotatably attached or locked onto the short lever shaft 122. The connecting shaft 126 is pivotally attached to the short lever 124 by a shaft pin 128. The opposite end of the shaft 126 is pivotally attached to the piston nut 34 by a clevis pin extending through the shaft 126 and the slotted end of the piston nut 34. The spring 56 biases the entire linkage 136 and tends to eliminate needle vibration and remove play from the linkage.

Figure 12:
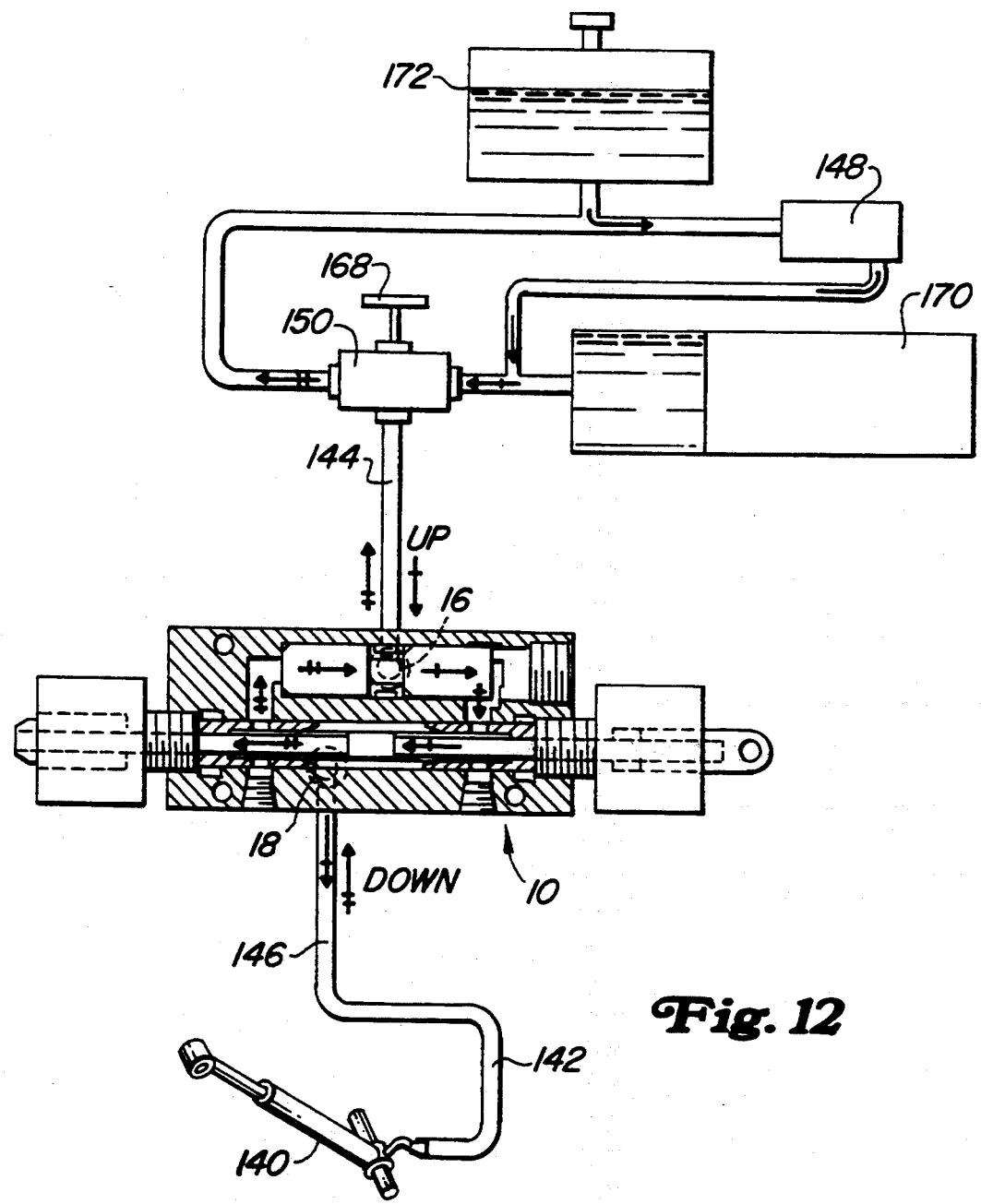
FIG. 12 is a hydraulic flow diagram.

Referring to FIG. 9, the relative positions of the hydraulic cylinder 140, hydraulic cylinder hose 142 and the pump motor 148 on the well known "Super PeeWee" camera dolly are shown. A main valve 150 in the dolly 100 has 3 positions: up, stop, and down. The main valve 150 is controlled by hand by turning a valve handle attached to the shaft 168 (FIG. 5). To retrofit the dolly 100 with the valve 10, the inlet hose 144 to the valve 10 replaces the cylinder hose 142 on the main valve 150, and the outlet hose from the valve 10 is joined to the cylinder hose via junction block 174 (FIG. 9). The valve 10 is then effectively placed in series with the main valve 150, and between the main valve 150 and the cylinder 140, as shown in FIG. 12.

With the valve 10 and linkage 136 installed as shown in FIGS. 6-9, the pump motor 148 is turned on and an accumulator 170 within the dolly 100 is pressurized with hydraulic fluid from a reservoir 172, as described in my U.S. Pat. No. 4,360,187. Alternatively, the accumulator 170 may be pumped or charged by hand pumping. The main valve 150 is turned to the up position and the arm begins to rise. The needle 30 is installed and initially calibrated using the nut 34 so that the needle center section 42 is centered between the up seat 52 and down seat 54, thereby allowing fluid flow in both (the up and down) directions. Thus, initially all control of the arm remains with the main valve 150. The adjust knobs 26 and 28 are set to the position shown in FIG. 1, allowing the arm to travel over its full range. As the arm rises, the seal 60 on the needle 30 is pulled (to the right in FIG. 1) into engagement with the up seat 52 closing off fluid flow and smoothly stopping the arm. A precise up stop position (lower than the maximum height position of the arm) is set by turning the up stop adjust knob 28 to back the up seat 52 away from the seal 60. This breaks the seal, allowing a small amount of additional fluid to flow into the cylinder 140, which in turn causes the arm to rise by a small additional increment, thereby closing off the valve 10 again. The arm may then be lowered and operate in the height range below the up stop position, but it will always return precisely to the selected up stop position, when the main valve is moved to the up position. Hence to return to a previous camera height, the dolly user or grip need only open the main valve.

Centering of the needle 30 may be confirmed by having the down stop adjust knob 26 and the up stop adjust knob 28 in the same relative positions with respect to the valve body 12.

A desired down stop position is achieved in a similar way. The arm is brought to a position above the desired down stop position by turning the main valve 150 to the down position. As the arm drops, the needle 30 is pushed into the valve housing 12 by the linkage 136. The seal 60 (on the left of center in FIG. 1) moves to seal against the down seat 54, thereby stopping movement of the arm. The down stop adjust knob 26 is turned out slightly, breaking the seal and allowing the arm to move to the desired down stop position. The adjust knobs 26 and 28 provide for very precise adjustments of the arm position by allowing a small fluid flow path before sealing. The arm may then be operated in the working range above the down stop position, but will always return precisely to the down stop position when the main valve 150 is turned to the down position.

The diameter S of the soft seal 60 is typically about 0.004 inches larger than the diameter T of the stem bore. If the needle 30 shifts in the up or down direction beyond its nominal working limits, the soft seal 60 will compress and slide within the seat bore 50, avoiding any damage to the seat 52 or 54 and the needle 30. When the needle 30 returns to a position within its nominal limits, the soft seal 60 will then expand to its original dimensions, and the valve 10 may continue to operate. In addition, since the needle 30 may pass beyond its nominal working positions, the linkage 136 also will not be damaged by over-nominal movement of the arm (or any other mechanisms used with the valve 10).

Detailed operation of the valve 10 is best understood with reference to FIGS. 2, 9 and 12. Opening the main valve 150 to the up position allows hydraulic fluid to flow through the inlet hose 144, into the inlet port 16 of the valve 10, and through the check valve bore 74, connecting bore 76, and needle bore 72, and out of the valve 10 through the outlet port 18 joined to the outlet hose 146. The outlet hose 146 is connected to the hydraulic cylinder hose 142 which connects directly to the hydraulic cylinder 140. Thus, with the main valve opened to the up position and the needle 30 centered between the valve seats 52 and 54, hydraulic fluid flows into the hydraulic cylinder 140 to raise the arm 102. As this occurs, the linkage 136 causes the short lever 124 to turn clockwise. Due to the small offset between the centers of the short lever shaft 122 and the shaft pin 128 (e.g., about 0.54 inch), the shaft 126 pulls the needle 30 (to the right in FIG. 1), so that the soft seal 60 approaches and moves into the up seat 52. As the soft seal 60 gradually moves into the up seat 52, hydraulic fluid flow is gradually reduced and then stopped. Consequently, the arm 102 is automatically smoothly brought to a stop. After the seal 60 seals against the up seat 52, no additional fluid can flow through the needle bore 72 and out of the outlet 18. The first check valve 22 allows only one way flow in the direction of the arrow in FIG. 1, so counterclockwise fluid flow to reach the outlet 18 is also prevented. Consequently, further upward movement of the arm is prevented, regardless of the up position of the main valve 150. However, fluid may flow clockwise past the down seat 54, which is not sealed, through the first check valve 22, and back out the inlet 16 and inlet hose, so that when the main valve 150 is turned to the down position, the arm can be lowered.

Similarly, when the arm is in a down stop position and the seal 60 is sealed against the down seat 54, no fluid can flow out of the inlet 16 to return to the main valve 150. The seal 60 prevents clockwise flow, and the second check valve 20 prevents counterclockwise flow. The arm therefore cannot be further lowered, despite the down position of the main valve 150. However, the arm may be raised if the main valve is turned to the up position, as fluid can flow in through inlet 16, past the second check valve 20 (in a clockwise direction), past the up seat 52, which is not sealed, and out of the outlet 18 to the cylinder 140.

FIG. 8 shows, in phantom line, the position of the linkage 136 with the arm 102 in the fully up position. FIG. 6 shows preferred dimensions for installing the linkage 136 on the (PeeWee) Camera Dolly 100 of FIG. 5. Referring to FIG. 6, in this embodiment the stud 114 is on a radius of 4.174 inches from the pivot 106 of the boom arm 102. The arm link 116 dimensioned between pivot centers (A) is 4.481 inches. The length (B) of the lever link 118 is 8.518, and is positioned horizontally with the boom arm 102 in the down position, as shown in FIG. 6. The dimension (C) between the centers of the shaft 122 and the shaft pin 128 is 0.541 inches. The lateral offset (D) is 0.142 inches. The angle of elevation of the stud 114 above horizontal (E) is 30.36°. Of course, other dimensions and linkages may be used. Use of the present valve 10 requires only that the needle 30 be mechanically linked to an arm or other element which is moved directly or indirectly by a hydraulic actuator. The type of arm or element is not important.

With the camera dolly of FIG. 5, when the valve 10 closes, against the up seat 52 or down seat 54, fluid flow is prevented, arm movement stops, and the boom arm is locked in position. By closing the main valve, a back up stopping seal may be provided.

The colored rings 38 on the adjust knobs 26 and 28 may be made to correspond to markings on the boom arm. For example, with the camera dolly 100 shown in FIG. 5, setting the adjust knob 26 so that the reference pin 66 points to a green circle on the knob 26 will cause green markings on the lower and upper arm members to precisely align, to achieve a desired stopping position.

Figure 10:
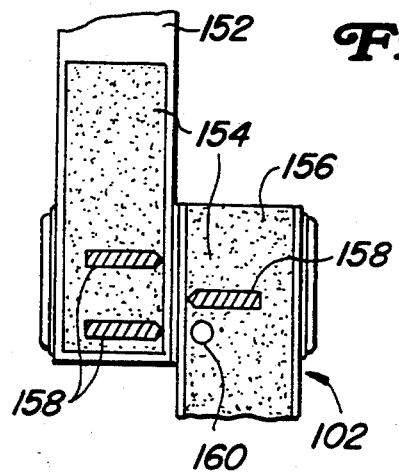
FIG. 10 is a rear elevation view fragment of the boom arm of the dolly of FIG. 5.

Preferably, Velcro hook tape 154 is applied to the lower and upper arm members 152 and 156 of the boom arm 102, in the region adjacent to the arm pivot 106, as shown in FIG. 10, to facilitate returning the arm (and the camera lens) back to a desired position. The desired position may initially be achieved by opening the main valve (into the up position), and then turning the up stop adjust knob 28 until the desired position is reached. Indicators, such as Velcro loop pointers 158 or dots 160, are then adhered to the Velcro hook tape 154, in alignment on the upper and lower arm members. Preferably, the colored ring indicated by the pointer 66 on the valve 10 matches the color of the Velcro loop arrows 158. If the arm is then raised or lowered to a different stop position using the down stop or up stop adjust knobs 26 or 28, the arm may subsequently be returned to its original desired position.

Figure 11:
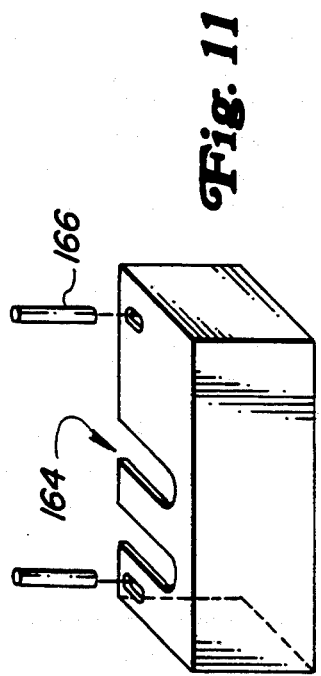
FIG. 11 is a perspective view of a valve cover.

As shown in FIG. 11, an open on one side cover may be attached to the dolly chassis 104, adjacent to the adjust knob 26 to cover the valve 10 and linkage members located to the outside of the second lower frame plate 110. The top of the cover is slotted so that it may slide over the inlet and outlet hoses 144 and 146. The cover is open on the inside, allowing passage over the valve body when closing. The cover may be pinned into a closed position over the valve 10. The pin bores 80 accept a pin for additional leverage on the knobs, for making adjustments while the valve 10 is under pressure. The pin bores 80 are protected from dirt by the oring 86 in the groove 82 over the holes (FIG. 1). When the pin bores are in use, the O-ring 86 is held on the holding groove 84. Operation of the valve 10 is purely mechanical, and accordingly it is independent of pressure or the speed of movement of the boom arm 102. Although the hydraulic pressure may vary with the stroke of the hydraulic cylinder 140, operation of the valve 10 is unaffected. The valve 10 may also be readily retrofitted onto existing equipment, such as the Super PeeWee dolly of FIG. 5, by reconnecting the hydraulic hoses.

The valve 10 may be used to adjust the arm position, or to provide stop positions along the entire length of travel of the arm 102. For example, up and down stop positions may be provided spaced only slightly apart, at the top or bottom end of range of travel of the arm 102. Alternatively, the up stop and down stop positions may be widely spaced apart to provide feathered or gradual stopping at the top and bottom extreme ranges of arm movement. Testing shows the valve 10 can consistently return the arm 102 to a desired stop position within about ±0.03 inches.

During motion picture filming, the dolly grip or operator must often steer the dolly 100 along a predetermined path, which may be marked on the floor with chalk or tape. At the same time, the camera height may have to be changed to a new position by raising or lowering the arm. These operations can be difficult, even for skilled operators, because the floor path, current arm position and intended new arm position must all be watched, and the main valve must be manipulated by hand, leaving only one hand to steer the dolly, which may weight several hundred pounds, when loaded with a camera, and which must be smoothly pushed during filming. The present valve 10 simplifies these operations. Once the desired up and down stop positions are set, the dolly operator can concentrate more on steering the dolly, as the desired arm position will be automatically achieved simply by turning the main valve 150 to the up or down position. The arm height need not be watched and the main valve need not be manipulated to achieve the desired arm position. It can simply be turned to the up or down position, and released, thereby allowing the dolly operator to use both hands to steer the dolly.

Thus, while a single embodiment has been shown and described, various modifications may be made without departing from the spirit and scope of the present invention.

What is claimed is:

1. A universal hydraulic valve comprising:
   a housing;
   a needle substantially within a needle bore in the housing, the needle having a center section including a first end and a second end, with the first end and second end of the center section each having a conical retainer and a soft seal;
   a first seat facing the first end and a second seat facing the second end, the first seat and second seat longitudinally adjustable within the housing to increase or decrease the spacing between the first seat and the first end of the center section and the second seat and the second end of the center section;
   a supply port and a return port, connecting to the needle bore; and
   a check valve in between the supply port and the return port.

2. A hydraulic stop valve comprising:
   a housing having a check valve bore, a needle bore, and first and second connecting bores at either end of the needle bore, connecting the check valve bore and the needle bore;
   an inlet leading into the check valve bore and an outlet leading into the needle bore, in between the connecting bores;
   a first check valve and a second check valve in the check valve bore on opposite sides of the inlet;
   a needle in the needle bore, the needle having a first seal spaced apart from a second seal;
   a first control knob positioned at a first end of the housing and having a first seat located in the needle bore and facing the first seal; and
   second control knob positioned at second end of the housing and having a second seat located in the needle bore and facing the second seal.

3. The valve of claim 2 further comprising a linkage attached to the needle.

4. The valve of claim 3 further comprising a spring for biasing the needle and linkage.

5. The valve of claim 2 wherein the first seal is adapted to fit through the first seat.

6. The valve of claim 2 wherein the first and second control knobs are threaded into the housing, and further comprising colored rings on the first and second control knobs.

7. The valve of claim 2 further comprising a first conical ring on the needle adjacent to the first seal, the conical ramp forming an angle of from 5° to 15° with respect to a longitudinal axis of the needle.

8. A universal hydraulic valve comprising:
   a housing;
   a needle substantially within a needle bore in the housing;
   a first seal and a second seal on the needle;
   a first seat facing the first seal and a second seat facing the second seal;
   adjusting means for adjusting the spacing between the first seat and the first seal;
   a supply port and a return port in the housing, connecting to the needle bore; and
   a check valve for preventing backflow through the needle bore.

9. The universal hydraulic valve of claim 8 further comprising second adjusting means for adjusting the spacing between the second seat and the second valve.

10. The universal hydraulic valve of claim 8 further comprising a linkage attached to the needle and to a hydraulically actuated element.

11. The universal hydraulic valve of claim 8 wherein the adjusting means comprises a knob threaded into the housing and attached to the first seat.

12. A universal hydraulic valve comprising:
    a housing;
    a needle substantially within a needle bore in the housing;
    a first soft seal and a second soft seal on the needle;
    a first seat facing the first seal and a second seat facing the second seal, the first seat and second seat each having a seat bore, with the first seat and the second seat adjustable within the housing to change the spacing between the first seat and first seal and between the second seat and the second seal, respectively, and with the first seal having a diameter section slightly larger than the diameter of the first seat bore;
    a supply port and a return port connecting to the needle bore; and
    a check valve in between the supply port and the return port.

13. The universal hydraulic valve of claim 12 wherein the second seal has a diameter section slightly larger than the diameter of the second seat bore.

14. A camera dolly comprising:
    a dolly frame;
    an arm pivotally attached to the frame;
    a hydraulic actuator linked to the arm;
    a hydraulic system for driving the hydraulic actuator; and
    a stop valve hydraulically connected to the hydraulic actuator and mechanically linked to the arm, the stop valve including:
    a housing;
    a needle substantially within a needle bore in the housing;
    a first seal and a second seal on the needle;
    a first seat facing the first seal and a second seat facing the second seal, the first seat being adjustable within the housing to change the spacing between the first seat and the first seal;
    a supply port and a return port in the housing, connecting to the needle bore; and check valves in between the supply port and the return port.

15. The camera dolly of claim 14 further comprising marking indicators on the arm of the dolly for indicating a preset arm position.

16. The camera dolly of claim 15 further comprising adjusting knobs adjoining the valve seats, and knob position indicators on the knobs.

* * * * *